ARTHUR SUSSMAN 3,666,353
DISPLAY SYSTEM INCLUDING STANDBY RETICLE MEANS
Filed Feb. 11, 1971
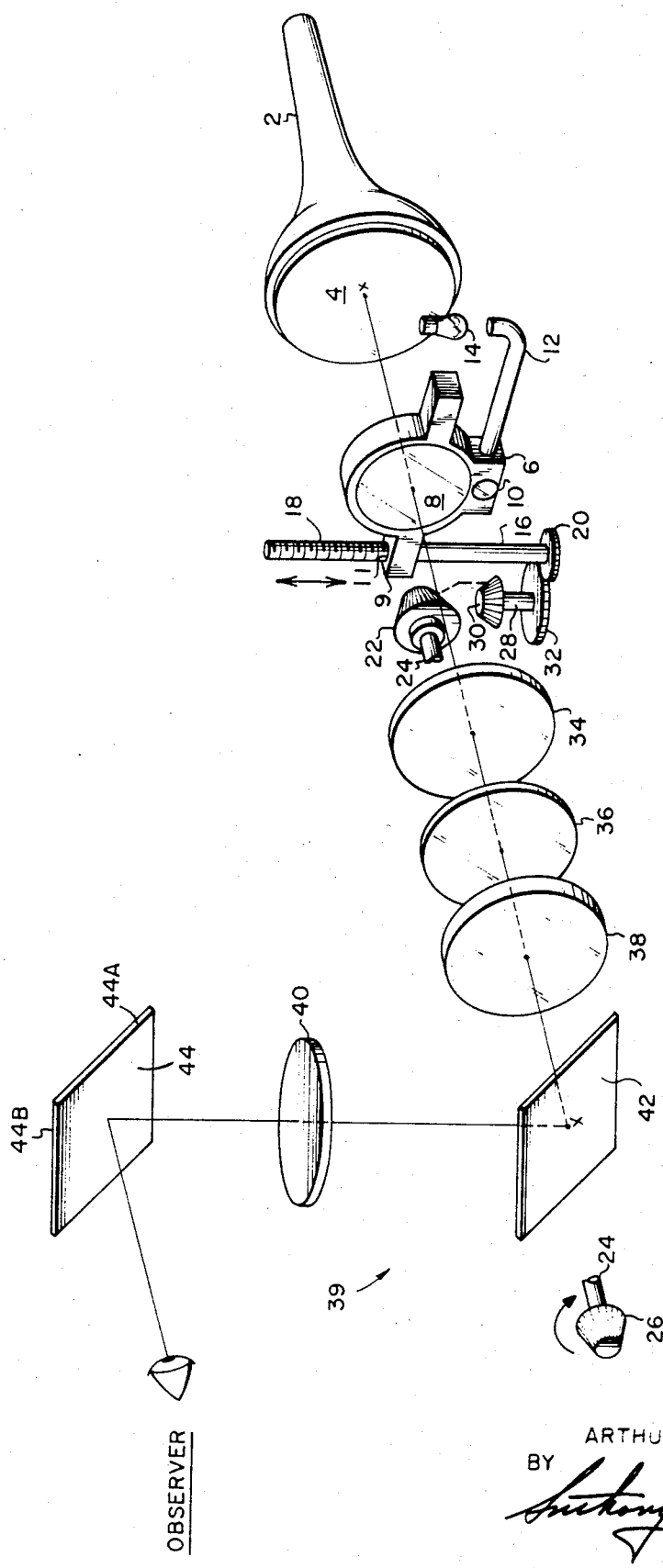
INVENTOR
ARTHUR SUSSMAN
BY
ATTORNEY

United States Patent Office 3,666,353
Patented May 30, 1972

3,666,353
DISPLAY SYSTEM INCLUDING STANDBY RETICLE MEANS
Arthur Sussman, Jersey City, N.J., assignor to The Bendix Corporation, Teterboro, N.J.
Filed Feb. 11, 1971, Ser. No. 114,556
Int. Cl. G02b 27/14, 5/16; H01j 29/89
U.S. Cl. 350—174                                     8 Claims

ABSTRACT OF THE DISCLOSURE

A head-up display system includes a cathode ray tube and means for projecting electronically generated information displayed on the tube to an observer. Upon failure of the tube a standby reticle containing some of the basic information normally displayed is positioned in the field of view and projected to the observer through the same projection means. The system features the use of fiber optics for providing increased accuracy and brightness with minimal space, weight and power requirements.

BACKGROUND OF THE INVENTION

Field of the invention

This invention relates to display systems of the type including a cathode ray tube for displaying electronically generated information and, particularly, to cathode ray tube display systems including standby reticle means arranged for operation in the event of an electronic failure. More particularly, this invention relates to display systems of the type described using fiber optics components.

Description of the prior art

Modern aircraft carry head-up display systems, wherein electronically generated navigational data displayed on a cathode ray tube is superimposed upon the pilots view of the real world, to aid the pilot in controlling the craft. Where military missions are involved, the display system may be adapted to provide weapons release information. In this case it is important that standby apparatus be provided so that in the event the elecronic sysem fails the mission is not abortive.

This may be accomplished by including standby reticles in the display system. However, prior to the present invention, display systems with standby reticles used beam splitters and mirrors to provide auxiliary focal planes for carrying the standby information. These devices added substantially to the size, complexity and cost of the display system. The device of the present invention overcomes this disadvantage by using a single focal plane for both the cathode ray tube and reticle displays.

SUMMARY OF THE INVENTION

The display system of the invention contemplates a cathode ray tube having a fiber optics faceplate and a movable frame carrying a fiber optics spacer plate and a standby reticle, and disposed in front of the faceplate. An outer fiber optics plate used to stabilize the imagery is disposed in front of the movable frame with collimating and combining means disposed in front of the outer plate. This arrangement allows cathode ray tube and reticle information to be contained in a single focal plane.

Normally the frame is positioned so that the spacer plate is centered about an optical center line and electronically generated information is transmitted through the faceplate and the spacer plate and finally through the outer plate, after which the information is projeced to an observer through the collimating and combining means. When the electronic system fails the frame is displaced to center the reticle about the center line, with the standby information being thereupon transmited through the outer plate and projected through the collimating and combining means to the observer. As noted above, the faceplate, spacer plate and outer plate are thin fiber optical discs allowing both cathode ray tube and reticle information to be contained in a single plane and allowing both images therefrom to be collimated using a single set of projection optics.

One object of this invention is to provide a display system whereby electronically generated information displayed on a cathode ray tube is projected to an observer, and including standby reticle means for providing basic information to the observer in the event of an electronic failure.

Another object of this invention is to provide a display system of the type described using fiber optics components for providing a display with increased brightness and accuracy and decreased size, weight and power requirements.

Another object of this invention is to contain the electronically generated and standby reticle data in a single focal plane for eliminating optical equipment such as beam splitters and mirrors which contribute to the size, weight and cost of the system.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustration purposes only and not to be construed as defining the limits of the invention.

DESCRIPTION OF THE DRAWING

The single figure in the drawing is an expanded isometric view showing the components of a display system according to the invention.

DESCRIPTION OF THE INVENTION

A conventional cathode ray tube 2, hereinafter referred to as CRT, has a fiber optics faceplate 4. The faceplate transfers electronically generated symbology from its internal to external surfaces, and on which external surface the symbology is displayed. The display may include aircraft attitude or condition data provided in a manner similar to that described in U.S. Pat. 3,324,471 issued June 6, 1967 to R. R. Rover, Jr.

Faceplate 4 is selected or designed with emphasis placed on characteristics such as surface flatness, image distortion and displacement, faceplate transmittance and high voltage break down, and it will be understood that the specific tolerances of these characteristics are commensurate with the results desired.

A frame 6 is disposed in front of CRT faceplate 4, and which frame 6 carries a fiber optics spacer plate 8 and a standby reticle 10. Plate 8 and reticle 10 occupy a plane parallel to that of faceplate 4. A fiber optics light pipe or guide 12 is supported by frame 6 for back illuminating reticle 10 with light from a light source 14.

Frame 6 has an arm 9 carrying an internally threaded hole 11 which receives a rod 16 having a threaded end 18 engaged in hole 11. The other end of rod 16 carries a spur gear 20.

A drive mechanism includes a bevel gear 22 mounted on a shaft 24, one end of which carries a knob 26. A shaft 28 carries at one end thereof a bevel gear 30 in meshing engagement with bevel gear 22, and carries at its other end a spur gear 32 in meshing engagement with spur gear 20.

A fiber optics outer plate 34 is disposed in front of frame 6 and a cover glass 36 is disposed in front of outer plate 34. Outer plate 34 and cover glass 36 occupy planes which are parallel to each other and parallel to the planes of faceplate 4 and spacer plate 8. Outer plate 34 and cover glass 36 occupy the focal plane of a collimating lens assembly 39 which includes a lens 38 disposed in a plane parallel to the aforenoted parallel planes, a lens 40 disposed in a plane normal to said planes and a 45° reflector 42 separating lenses 38 and 40.

Collimating lens assembly 39 functionally provides an image of the symbology displayed on faceplate 4 of CRT 2 which appears at infinity, allowing the observer to view both the symbology and real world targets without parallax. For purposes of illustration, lenses 38 and 40 may be of the f/.95 Petzval type, corrected for parallax, distortion and color over the spectral range of P–1 type CRT phosphor for filtering purposes.

A combining glass 44 is disposed along the pilots forward line of sight and in a conventional manner, superimposes the image projected through the collimating lens into the pilots view of the real world. In this connection reference is made to U.S. Pat. 3,237,193 issued Feb. 22, 1966 to R. S. Curry, Jr. et al., and wherein apparatus for superimposing electronically generated images onto a real world view is described.

Combining glass 44 is a flatplate of highest quality optical glass, with both surfaces ground and polished to a high degree of flatness. A combining surface 44A of glass 44 is coated with a high efficiency, neutral density reflective coating having a transmittance of 75% over the visible spectrum. An opposite surface 44B is coated with an anti-reflectant to prevent secondary images from reaching the pilot as will now be understood by those skilled in the art.

OPERATION

For normal operation of the display system, spacer plate 8 is centered about an optical center line X—X as are faceplate 4, outer plate 34, glass 36 and lens 38 as shown in the figure. The electronically generated image is transmitted through faceplate 4, through disc 8 and finally through disc 34 and cover glass 36, whereupon the image is projected to the observer through collimating means 39 and combiner 44.

When the cathode ray tube fails, that is, when the required information is for one reason or another no longer electronically generated, knob 26 is turned to rotate shaft 24, whereupon frame 6 is displaced, through the aforenoted drive mechanism, normal to optical center line X—X to center reticle 10 about the center line. Plate 8 is sandwiched between plate 34 and CRT faceplate 4 and in close proximity (in the order of several thousandths of an inch) thereto. This allows for back illuminating reticle 10 with light from light source 14 channeled through light pipe 12, while allowing both the CRT and reticle information to occupy the single focal plane of the system.

It is to be noted that reticle 10 is constructed of fiberous strands formed into the reticle pattern at the light output end and clustered at the light input end for maximum lighting. The input end of the reticle 10 is illuminated by light from light source 14, and which light transfers through the fiberous strands and exits from the reticle surface. The reticle pattern passes to the output surface of plate 34 and is thereafter projected to the pilot as heretofore noted.

Though reticle 10 and plate 8 translate in a single plane, disc 34 provides a stationary image thereby eliminating the parallax that might otherwise be introduced by positional tolerances during reticle translation. It will now be understood by those skilled in the art that through sufficiently close manufacturing tolerance for reticle 10, the need for outer plate 34 may be eliminated and therefore this component is optional in the invention.

In summary then, the system of the invention features a fiber optics optical system to contain both CRT and reticle modes of information in a single focal plane, while providing for back illumination of the reticle, and thereby offers a highly reliable standby reticle design requiring little in the way of size, weight and power. Such a device functionally extends the usefulness of a display system having a head-up display such as used in aircraft navigation, should failure of the primary electronic system occur. When such is the case, the reticle information, which contains some basic informally normally provided by the electronic system, is transmitted to the pilot through the single projection system.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. An aircraft display system comprising:
   primary display means for displaying condition information;
   first optical means centered about an optical axis for transmitting displayed information;
   said first optical means
       comprising a fiber optics spacer plate centered about the optical axis and disposed ahead of the primary display means;
       a fiber optics outer plate centered about the optical axis and disposed ahead of the spacer plate; and
       a cover glass centered about the optical axis and disposed ahead of the outer plate;
   second optical means for projecting the transmitted information;
   standby display means;
   a movable frame; the fiber optics spacer plate and the standby display means being supported by the frame;
   means coupled to the frame for moving said frame in a direction normal to the optical axis for centering the standby display means about the optical axis when said primary display means fails.

2. A display system as described by claim 1, wherein the primary display means includes:
   a cathode ray tube having a fiber optics faceplate centered about the optical axis for displaying electronically generated information.

3. A display system as described by claim 2, wherein: the faceplate, the spacer plate and the outer plate are arranged so that the spacer plate is in relatively close proximity to the faceplate and the outer plate.

4. A display system as described by claim 1, wherein the second optical means for projecting the transmitted information includes:
   collimating means disposed ahead of the first optical means for collimating the transmitted information; and
   combining means disposed along an observers line of sight for receiving the collimated information and for projecting said information to the observer.

5. A display system as described by claim 4, wherein the collimating means includes:
   a first leans centered about the optical axis and disposed ahead of the first optical means;
   a second leans centered about an axis normal to the optical axis and disposed ahead of the first lens; and
   a reflector disposed intermediate the first and second lenses and in angular relation to the optical axes and the axis normal thereto.

6. A display system as described by claim 5, wherein the combining means includes:
   a plate of optical glass having combining and opposite faces finished to a relatively high degree of flatness;

the combining face having a high efficiency, neutral density, reflective coating; and the opposite face having an anti-reflective coating.

7. A display system as described by claim 2, wherein:

the standby display means includes a reticle; and the frame supports a fiber optics light pipe for transmitting light from a light source to back-illuminate the reticle.

8. A display system including standby reticle means, comprising:

a cathode ray tube having a fiber optics faceplate in a plane normal to an optical axis and centered about said axis, and displaying electronically generated condition information;

a spacer plate;

a standby reticle;

a movable frame for supporting the spacer plate and the reticle in front of the faceplate in a plane parallel to the plane of the faceplate, with the spacer plate being initially centered about the optical axis;

means for moving the frame in the plane parallel to the plane of the faceplate to center the reticle about the optical axis;

an outer plate disposed in front of the spacer plate and in a plane parallel to the plane of the faceplate, and centered about the optical axis;

a cover glass disposed in front of the outer plate and in a plane parallel to the plane of the faceplate, and centered about the optical axis;

a first lens disposed in front of the cover glass and in a plane parallel to the plane of the faceplate, and centered about the optical axis;

a second lens disposed above the first lens and in a plane normal to the plane of the faceplate;

a reflector disposed intermediate the first and second lenses and in a plane angularly related to the planes of said lenses; and a combining glass disposed above the second lens and in the forward line of sight of an observer.

References Cited

UNITED STATES PATENTS

| | | | |
|---|---|---|---|
| 2,985,784 | 5/1961 | MacNeille | 350—96 B |
| 3,291,906 | 12/1966 | Ward et al. | 178—7.85 |
| 3,446,916 | 5/1969 | Abel et al. | 178—7.85 |

FOREIGN PATENTS

| | | | |
|---|---|---|---|
| 1,037,823 | 8/1966 | Great Britain | 350—174 |
| 175,792 | 6/1961 | Sweden | 350—174 |

DAVID SCHONBERG, Primary Examiner

J. W. LEONARD, Assistant Examiner

U.S. Cl. X.R.

178—DIG 2, DIG 20, 7.85; 350—96 B